May 15, 1951
T. C. SMITH
2,553,340
SEAL FOR AUXILIARY FILLING NIPPLES
Filed Oct. 22, 1947
2 Sheets-Sheet 1
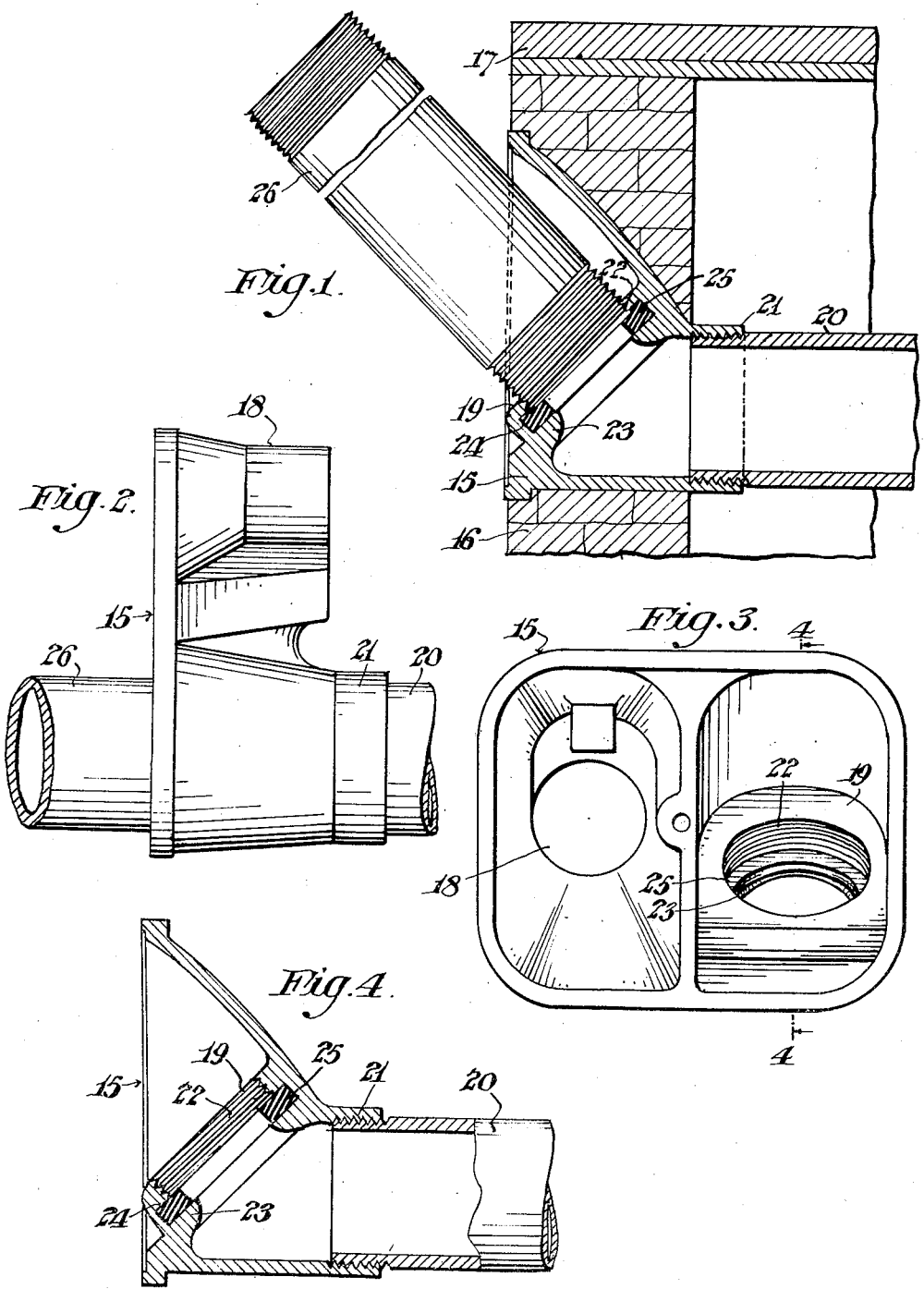
Inventor
Theodore C. Smith,
By W. W. Williamson
Attorney May 15, 1951 T. C. SMITH 2,553,340
SEAL FOR AUXILIARY FILLING NIPPLES
Filed Oct. 22, 1947 2 Sheets-Sheet 2
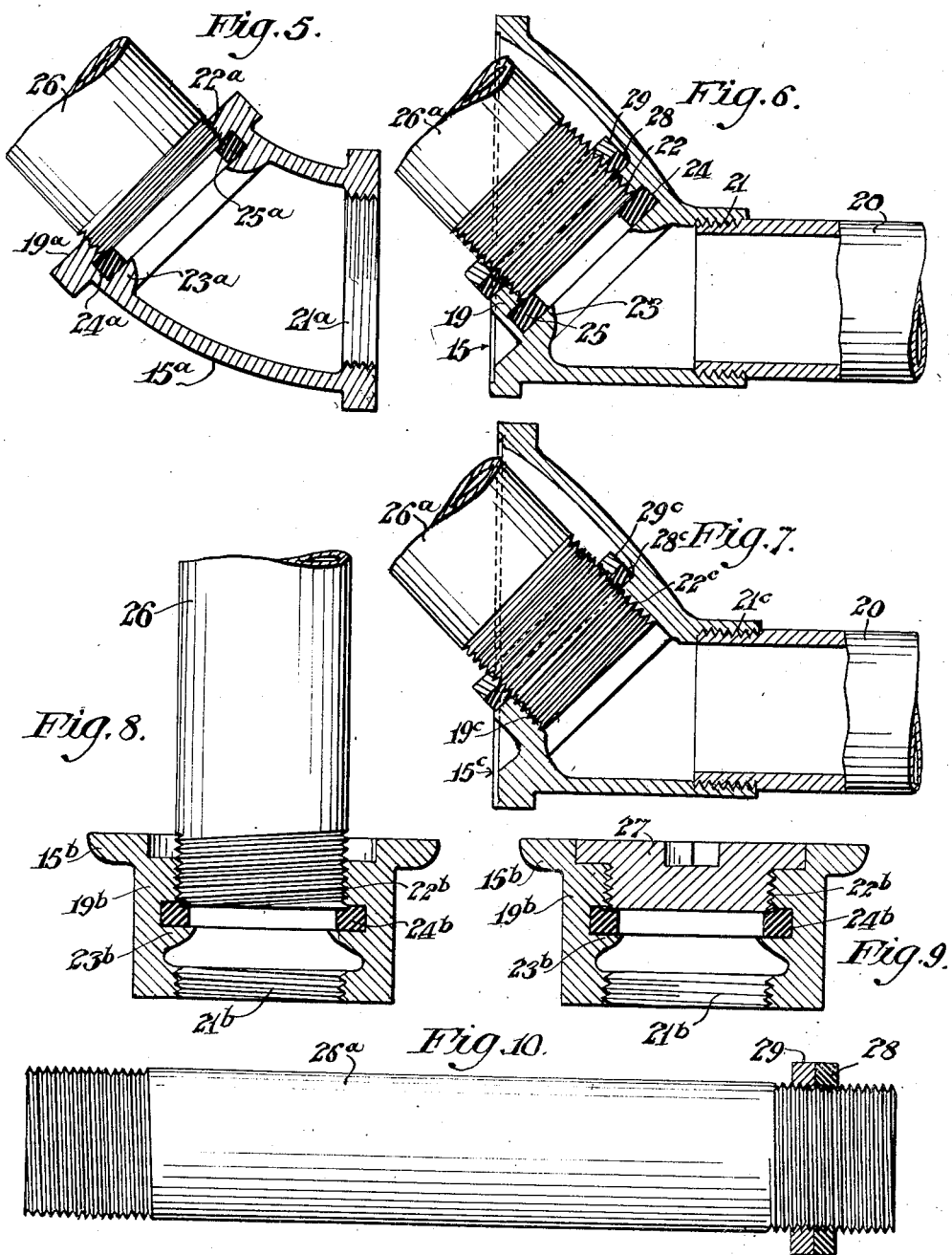
Inventor
Theodore C. Smith,
By W. W. Williamson
Attorney.

Patented May 15, 1951

2,553,340

UNITED STATES PATENT OFFICE 2,553,340

SEAL FOR AUXILIARY FILLING NIPPLES

Theodore C. Smith, Drexel Hill, Pa.

Application October 22, 1947, Serial No. 781,347

5 Claims. (Cl. 285—27)

My invention relates to new and useful seals for auxiliary filling nipples such as are often used in connection with fill lines of tanks, in general, and liquid fuel tanks, in particular. Generally, the inlet end of a fill line is approximately flush with or inside of the plane of the surface of a building or the ground considered as including pavements, driveways and other localities where fill lines leading to tanks may be situated. The inlet ends of fill lines may include various types of fittings, terminal boxes or fill-vent boxes to permit the employment of means to close said inlet ends and the easy use of a filling nozzle or gun which is inserted in the inlet ends of the fill lines during filling operations.

It has been learned that by temporarily mounting an auxiliary filling nipple of considerable length, say twelve to sixteen inches long, in the inlet end of a fill line, the outer end of said fill line is extended, which permits easier access for the insertion of the gun and provides a rather long straight runway for the liquid before reaching any turns which change the direction of flow on the way to the tank. This reduces to a minimum or entirely eliminates the possibility of the liquid flow being slowed up or blocked which might cause an overflow from the inlet end of the fill line resulting in damage to property or creating a fire hazard.

In using an auxiliary filling nipple the operator must screw said nipple tightly into the inlet end of the fill line. This usually requires the use of a wrench to tighten the nipple prior to proceeding with the filling operations, otherwise a leaky joint might result and liquid would be spilled, and the further use of said wrench after completion of the filling operations, to loosen the nipple. Such additional manipulations waste the time of the operator and consequently the number of filling operations that could otherwise be accomplished in a given time are greatly reduced and time is an essential element in the delivery costs of such liquids as fuel oil and gasoline.

An object of the present invention is to overcome the disadvantages enumerated above by providing a seal for the joint between the inlet end of the fill line and the auxiliary filling nipple.

Another object is to provide a seal for the joint between two articles, items or members, the sealing elements being carried by either or both of said members.

Another object of this invention is to provide a joint sealing means carried by or mounted in the inlet end of a fill line exemplified by the structure constituting a socket whether it be a pipe fitting, a terminal of the fill line, a terminal box, a fill-vent box or other equivalent device.

Another object of the present invention is to provide a joint sealing means carried by or mounted on an auxiliary filling nipple.

Another object of the invention is to provide the inlet socket of a fill-vent box or similar structure with a joint sealing means.

Another object of the invention is to provide one socket end of a pipe fitting with a joint sealing means.

A further object of this invention is to provide an auxiliary filling nipple with a joint sealing means.

A still further object of the present invention is to provide an auxiliary filling nipple with a sealing means which is adjustable longitudinally of said nipple.

With the above and other objects in view this invention consists of the details of construction and combination of elements hereinafter set forth and then designated by the claims.

In order that those skilled in the art to which this invention appertains may understand how to make and use the same I will describe its construction in detail referring by numerals to the accompanying drawing forming a part hereof, in which:

Fig. 1 is a sectional view of an installation of fill-vent box in a building wall and an auxiliary filling nipple shown inserted in the inlet opening and the joint closed by the seal.

Fig. 2 is a top plan view of the fill-vent box and auxiliary filling nipple.

Fig. 3 is a front view of the box.

Fig. 4 is a section of the box on the line 4—4 of Fig. 3.

Fig. 5 is a sectional view of a pipe fitting illustrating an application of the seal thereto with a portion of the auxiliary filling nipple inserted.

Fig. 6 is a sectional view of a fill-vent box with an auxiliary filling nipple therein showing the use of a sealing means on both elements to produce a joint seal.

Fig. 7 is a similar view with the sealing means on the auxiliary filling nipple only.

Fig. 8 is a sectional view of a terminal box to which the invention is applied with a filling nipple mounted therein.

Fig. 9 is a similar view of the same type of box with its closure in place.

Fig. 10 is a side elevation of an auxiliary filling nipple having the sealing means thereon shown in section.

In carrying out my invention as herein embodied, reference will first be made to Fig. 1, wherein a fill-vent box 15 is shown mounted in a wall 16 supporting a ceiling 17 of a cellar or other apartment in which a liquid fuel tank (not shown) may be located.

For purposes of illustration only, the fill-vent box, which is one of the articles or elements of the invention, as herein shown comprises a box body of any desirable shape or configuration and size so fashioned as to provide means for the reception of the outlet end of a vent line or pipe open to the atmosphere, herein shown as a socket 18, and means for the reception of the inlet end of a fill line or pipe 30 leading to the tank, herein shown as a socket 19, all combined in one device.

The socket 19 is the one with which we are particularly concerned and is to be considered as a part of the inlet end of the fill line 20 although in this instance there is a socket 21 into which the fill pipe is actually screw threaded.

Referring particularly to Figs. 1, 3, 4 and 6, the socket 19 is provided with a threaded portion 22 and beyond, below or spaced from the inner end of the threaded portion is an annular rib or ridge 23 which surrounds or projects radially into the main bore of said socket and the opening produced by said ridge or rib is smaller than that provided by the threaded portion.

Between said threaded portion 22 and the annular rib or ridge 23 is formed an annular groove 24 in which an annular compressible gasket 25, of rubber or rubber-like material is mounted. A face of the groove 24 is flush with the outer or upper face of the rib or ridge to provide a shoulder against which the gasket rests and inner diameter of said gasket or the hole through it is larger than the opening formed by the rib. This eliminates or reduces to a minimum the possibility of the gasket being expanded past the edge of the rib when compressed.

The numeral 26, Figs. 1 to 4, inclusive, denotes the auxiliary filling nipple which is of considerable length and is to be screwed into the inlet end of the fill line or, more particularly, the socket 19 forming a part of said inlet end of said fill line. As said filling nipple is screwed into place, the inner end engages the gasket 25 and compresses the latter sufficiently to produce a liquidtight joint even where the threads in the socket or on the filling nipple are worn, damaged or loose fitting. The filling nipple can be placed in position and removed by hand without the use of tools so that the parts will not be marred and the operations can be accomplished with alacrity thus saving considerable time in actual place to place delivery operations.

In Fig. 5 a similar construction is shown embodied in a pipe fitting 15a, as one of the articles, wherein one end constitutes the socket 19a while the opposite end is threaded, as at 21a, to receive an end of a fill pipe, the same as previously mentioned. The socket 19a includes a threaded portion 22a and an annular rib or ridge 23a with the groove 24a between them to receive and hold the annular compressible gasket 25a. The pipe fitting or article 15a with the fill pipe constitute the fill line and said pipe fitting or article functions as the inlet end of said fill line. The auxiliary filling nipple 26, which is interchangeable, is screwed into the socket and coacts with the gasket to produce a liquidtight joint.

A further modification of essentially the same structure is illustrated in Figs. 8 and 9 where the article 15b is shown as a terminal box or what is known as a filling fitting for gasoline tanks. In this form of the device one end constitutes the socket 19b while the other end is threaded at 21b for connection with a fill pipe the same as described above. The socket 19b includes a threaded portion 22a and an annular rib or ridge 23b with the groove 24b between them to receive and hold the annular compressible gasket 25b. The terminal box 15b with the fill pipe constitute the fill line and said fill line or terminal box acts as the inlet end of said fill line. This type of article also includes a plug closure 27 that fits the threaded portion 22b and said closure may be long enough to engage and compress the gasket to form a tight joint when in place. After removal of the closure, the auxiliary filling nipple 26 may be inserted in place of the closure for the same purpose as above set forth.

The fill-vent box or article 15 shown in Fig. 6 is identical to that illustrated in Figs. 1 to 4, inclusive, but the difference between the two is that the auxiliary filling nipple 26a, Figs. 6, 7 and 10, has an annular gasket 28 mounted on the outside thereof in the region of the threads on at least one end and, preferably, adjustable longitudinally of said nipple. To prevent flexing of the gasket a stiff or rigid backing member 29 is located back of the gasket to be engaged by the latter and said backing member may be a metal washer having threaded connection with filling nipple so as to be adjustable longitudinally of said nipple.

Again referring to Fig. 6, when the auxiliary filling nipple is screwed into the threaded portion of the socket or inlet of the fill line the inner end of said filling nipple will engage and compress the gasket 24 and if the gasket 28 is properly spaced from said inner end of said nipple said gasket 28 will engage some outer surface and further seal the connection between the two articles. If the gasket is not properly spaced so that both gaskets function simultaneously, the gasket 28 and its backer 29 may be adjusted so as to accomplish the desired result. This may be done after the filling nipple has been screwed all the way into the socket by merely turning the backing member in the proper direction to force the gasket 28 onto a seat. As the auxiliary filling nipple is interchangeable it can be used in a similar manner with the fitting Fig. 5, the terminal box of Figs. 8 and 9 or other equivalent structures constituting the inlet ends of fill lines.

The auxiliary filling nipple with its own sealing means, Fig. 10, can be used without the gasket in a socket structure, as shown in Fig. 7 merely for purposes of illustration, because it can be used with various types of inlet ends of fill lines or sockets, typified by those depicted in the drawings. In an instance of this kind the fill-vent box 15c, representing one of the articles has a plain or simple socket 19c, with a threaded portion 22c but without the associated sealing gasket, at the outer or forward end, while the opposite end is threaded at 21c to receive an end of a fill pipe. The fill-vent box 15c, or other equivalent device, with the fill pipe constitute the complete fill line and said fill-vent box or article 15c functions as the inlet end of said fill line. The auxiliary filling nipple 26a being usuable with any threaded and socketed inlet end of a fill line, is screwed into the socket until its sealing gasket seats on an exposed surface of the inlet end or socket to produce a liquidtight sealed joint. A convenient method of accomplishing the sealing action is to move both the backing member 29 and the gasket 28 inward relative to the end of the filling nipple which is to be screwed into the socket, then screwing said end into said socket and finally screwing the backing member towards the socket until contact is made with a seating surface and the gasket slightly compressed.

Regardless of the type of seal used the auxiliary filling nipple is an extension of the fill line and protrudes from the usual inlet end of said fill line to permit an operator to insert the gun so that no liquid is likely to back up and spill out of the filling nipple and due to the sealed joint at the inner end of said filling nipple no liquid can accidentally escape at that location which might damage property and even produce a fire hazard. Because of the above features, the operator does not have to be extra careful during the actual filling operations and since the auxiliary filling nipple can be installed, for temporary use, easily and quickly, and just as hastily removed, by hand, the delivery operations can be speeded up, resulting in a considerable saving of time and expense.

From the foregoing it will be apparent that I have provided an exceedingly efficient seal for the joint between the inlet and of a fill line and an auxiliary filling nipple which can be embodied in either or both the fill line and said auxiliary filling nipple which can be embodied in either or both the fill line and said auxiliary filling nipple and one that will be relatively inexpensive in the cost of manufactue although strong and durable.

Of course I do not wish to be limited to the exact details of construction herein shown and described as these may be varied within the scope of the appended claims without departing from the spirit and intent of the invention.

Having described my invention what I claim as new and useful is:

1. A fill-vent box having a threaded socket constituting an inlet end for a fill line leading to a liquid tank, said socket having an annular gasket retaining groove in succeeding relation to the threads, an annular rib about the inside of the socket in succeeding relation to said gasket retaining groove, and an annular gasket positioned in said groove and resting on the rib, the inside diameter of the gasket being larger than the inside diameter of the annular rib and adapted to coact with an auxiliary filling nipple in abutting sealing relation when the latter is screwed into the socket.

2. A fill-vent box having a socket to receive an auxiliary filling nipple and constituting the inlet end of a fill line leading to a tank, said socket having an annular gasket retaining groove within its confines, and an annular gasket mounted in said groove to be engaged in abutting sealing relation by the filling nipple when the latter is temporarily and removably mounted in said socket.

3. A fill-vent box having an upwardly and outwardly inclined socket with a threaded portion to receive an auxiliary filling nipple and constituting the inlet end of a fill line leading to a tank, said socket having an annular gasket retaining groove succeeding the threaded portion, a compressible annular gasket mounted in said groove and having a portion projecting from said groove in the path of travel of the filling nipple as the latter is screwed into the threaded portion of the socket for abutting sealing engagement with said gasket, and means on the socket succeeding the groove and backing the projecting portion of said gasket.

4. A device of the kind described, a fill-vent box having a socket constituting the inlet end of a fill line leading to a tank, said socket having an annular gasket retaining groove within its confines, an annular compressible gasket mounted in said groove with the inner periphery of said gasket extending outside of the groove, an auxiliary filling nipple screwed into the socket until its inner end engages the gasket in abutting sealing relation, and a second compressible gasket adjustably mounted on said filling nipple to engage the outer end of said socket in abutting sealing relation.

5. A fill vent box having a socket to receive an auxiliary filling nipple and constituting the inlet end of a fill line leading to a tank, said socket having an annular gasket retaining groove within its confines, and an annular gasket mounted in said groove to be engaged in abutting sealing relation by the filling nipple when the latter is temporarily and removably mounted in said socket.

THEODORE C. SMITH.

REFERENCES CITED

The following references are of record in the file of this patent:

UNITED STATES PATENTS

| Number | Name | Date |
|---|---|---|
| 634,820 | Henry et al. | Oct. 10, 1899 |
| 784,931 | Duncan | Mar. 14, 1905 |
| 860,911 | Fruin | July 23, 1907 |
| 1,190,641 | Greaves | July 11, 1916 |
| 1,796,077 | Boosey | Mar. 10, 1931 |
| 2,140,559 | Sculley et al. | Dec. 20, 1938 |
| 2,150,221 | Hinderliter | Mar. 14, 1939 |
| 2,319,410 | Leary | May 18, 1943 |
| 2,399,167 | Chouinard | Apr. 30, 1946 |